(12) United States Patent
Stavariu

(10) Patent No.: US 10,933,601 B2
(45) Date of Patent: Mar. 2, 2021

(54) CORRUGATOR, EXTRUSION SYSTEM AND METHOD

(71) Applicant: Schlemmer GmbH, Poing (DE)

(72) Inventor: Alin Stavariu, Poing (DE)

( * ) Notice: Subject to any disclaimer, the term of this patent is extended or adjusted under 35 U.S.C. 154(b) by 6 days.

(21) Appl. No.: 16/315,617

(22) PCT Filed: Jul. 6, 2017

(86) PCT No.: PCT/EP2017/066917
§ 371 (c)(1),
(2) Date: Jan. 4, 2019

(87) PCT Pub. No.: WO2018/007512
PCT Pub. Date: Jan. 11, 2018

(65) Prior Publication Data
US 2019/0168474 A1      Jun. 6, 2019

(30) Foreign Application Priority Data

Jul. 6, 2016    (DE) .................... 10 2016 112 421.4

(51) Int. Cl.
*B29C 48/09*       (2019.01)
*B29C 48/13*       (2019.01)
(Continued)

(52) U.S. Cl.
CPC ............ *B29D 23/18* (2013.01); *B29C 33/306* (2013.01); *B29C 48/0017* (2019.02);
(Continued)

(58) Field of Classification Search
CPC ... B29C 48/0017; B29C 48/025; B29C 48/09; B29C 48/13; B29C 48/265; B29C 48/901; B29C 48/904; B29C 48/912
See application file for complete search history.

(56) References Cited

U.S. PATENT DOCUMENTS

| | | |
|---|---|---|
| 5,693,347 A | 12/1997 | Hegler |
| 6,485,286 B1 | 11/2002 | Hoffmann et al. |

(Continued)

FOREIGN PATENT DOCUMENTS

| | | |
|---|---|---|
| CN | 1604838 A | 4/2005 |
| CN | 101146726 A | 3/2008 |

(Continued)

OTHER PUBLICATIONS

Russian Federal Service for Intellectual Property, Office Action Issued in Application No. 2019100007/05, dated Aug. 16, 2019, 14 pages.

(Continued)

*Primary Examiner* — Xiao S Zhao
*Assistant Examiner* — Joseph S Leyson
(74) *Attorney, Agent, or Firm* — Alleman Hall Creasman & Tuttle LLP

(57) ABSTRACT

A corrugator for an extrusion system for shaping a tubular plastic product, having a multiplicity of mould blocks, a guide track, along which the mould blocks are guided in each case in pairs during the operation of the corrugator from a starting region of the guide track towards an outlet region of the guide track, a first return track, along which the mould blocks are guided during the operation of the corrugator from the outlet region towards the starting region, and a second return track, with the aid of which individual mould blocks can be removed from the first return track and/or can be inserted into the latter during the operation of the corrugator.

16 Claims, 4 Drawing Sheets

(51) Int. Cl.
*B29C 48/30* (2019.01)
*B29C 48/90* (2019.01)
*B29D 23/18* (2006.01)
*B29C 49/00* (2006.01)
*B29C 33/30* (2006.01)
*B29C 53/30* (2006.01)
*B29C 48/025* (2019.01)
*B29C 48/265* (2019.01)
*B29C 48/00* (2019.01)
*B29L 23/18* (2006.01)

(52) U.S. Cl.
CPC ............ *B29C 48/025* (2019.02); *B29C 48/09* (2019.02); *B29C 48/13* (2019.02); *B29C 48/265* (2019.02); *B29C 48/303* (2019.02); *B29C 48/901* (2019.02); *B29C 48/904* (2019.02); *B29C 49/0021* (2013.01); *B29C 53/30* (2013.01); *B29L 2023/18* (2013.01)

(56) References Cited

U.S. PATENT DOCUMENTS

| | | | |
|---|---|---|---|
| 2002/0025355 A1 | 2/2002 | Lupke et al. | |
| 2002/0113339 A1 | 8/2002 | Starita | |
| 2005/0012249 A1 | 1/2005 | Kimura | |
| 2008/0068133 A1* | 3/2008 | Hashimoto | G06K 7/0008 340/10.1 |

FOREIGN PATENT DOCUMENTS

| | | |
|---|---|---|
| CN | 105531205 A | 4/2016 |
| DE | 19535231 A1 | 3/1997 |
| DE | 19845321 A1 | 4/2000 |
| DE | 20007270 U1 | 10/2000 |
| DE | 202005021219 U1 | 5/2007 |
| SU | 910437 A1 | 3/1982 |
| SU | 1214462 A1 | 2/1986 |
| WO | 2007058548 A1 | 5/2007 |
| WO | 2016011532 A1 | 1/2016 |

OTHER PUBLICATIONS

China National Intellectual Property Administration, Office Action and Search Report Issued in Application No. 201780041887.0, dated Apr. 21, 2020, 24 pages.

Korean Intellectual Property Office, Office Action Issued in Application No. 10-2019-7001130, dated Apr. 9, 2020, Korea, 16 Pages.

China National Intellectual Property Administration, Office Action and Search Report Issued in Application No. 201780041877.0, dated Nov. 16, 2020, 27 pages.

* cited by examiner

CORRUGATOR, EXTRUSION SYSTEM AND METHOD

FIELD OF THE INVENTION

The present invention relates to a corrugator for an extrusion system, to an extrusion system having a corrugator of this type, and to a method for operating a corrugator of this type.

BACKGROUND

A corrugator is a machine used in the processing of plastics, which is used in the production of corrugated plastics pipes or plastics tubes. Plastics products of this type can also be referred to as corrugated pipes or corrugated tubes. With the aid of a corrugator of this type a continuous plastics product can be made, said continuous plastics product subsequently being cut to length. The corrugator forms a flow of plastics melt that is made available by an injection head of an extruder to a tube. The corrugator furthermore comprises a multiplicity of mold blocks which represent a negative mold of an external geometry of the plastics product. With the aid of compressed air, the plastics tube that is made available by the injection head can be pushed on the internal side against the mold blocks, on account of which the external geometry of the plastics product results. A major part of the thermal energy can also be extracted from the plastics material by way of the mold blocks.

DESCRIPTION OF RELATED ART

DE 195 35 231 A1 describes a device for producing pipes from a thermoplastic plastics material having a transverse profile feature. The device comprises mold portion halves which are guided in pairs so as to circulate on a molding section. A transportation device for returning the mold portion halves is furthermore provided, said transportation device being configured in the manner of a gantry crane. Two transportation carriages that are repositionable transversely to the production direction and in mutually opposite directions are provided on a transportation gantry that engages across the molding section, in each case one downwardly directed transporting arm having a holding device for in each case one mold portion half being attached to said transportation carriages.

U.S. Pat. No. 6,485,285 B1 shows a corrugator having two different types of mold blocks. The corrugator comprises an interchange installation with the aid of which individual mold blocks in the operation of the corrugator can be interchanged perpendicularly to a direction of movement of the mold blocks.

SUMMARY

Against this background, an object of the present invention lies in making available an improved corrugator.

Accordingly, a corrugator for an extrusion system for shaping a tubular plastics product is proposed. The corrugator comprises a multiplicity of mold blocks, a guide track along which the mold blocks in the operation of the corrugator are guided in each case in pairs from a starting region of the guide track toward an outlet region of the guide track, a first return track along which the mold blocks in the operation of the corrugator are guided from the outlet region toward the starting region, and a second return track with the aid of which individual mold blocks in the operation of the corrugator are capable of being extracted from the first return track and/or inserted into the latter.

On account of individual mold blocks being capable of being extracted from the first return track to the second return track and/or inserted from the second return track into the first return track, a sequence of the mold blocks along the guide track can be varied without the extrusion system having to be stopped. A significantly lower complexity in terms of tooling and less starting-up waste result on account thereof. Small volumes of the plastics product can also be produced, on account of which a reduced inventory is possible. Sorting the parts of the cut-to-length plastics product can be performed automatically. Fewer error sources result on account of the automatic assembly of the mold blocks. The mold blocks can be readily interchanged in the event of a running corrugator.

In the operation of the corrugator individual mold blocks from an arbitrary sequence of mold blocks are in particular capable of being extracted from the first return track with the aid of the second return track, wherein said extracted mold blocks are then received in the second return track. The non-extracted mold blocks, again with the aid of the first return track, are guided from the outlet region toward the starting region, in order for said non-extracted mold blocks to be fed to the guide track again. Conversely, in the operation of the corrugator individual mold blocks are capable of being inserted in an arbitrary sequence of mold blocks into the first return track with the aid of the second return track, wherein said inserted mold blocks, conjointly with the remaining mold blocks, are then fed to the guide track with the aid of the first return track. This means that the shaping of the plastics product is not interrupted either for inserting as well as for extracting individual mold blocks. In the case of the corrugator, a plurality of mold blocks are also in particular capable of being successively extracted from the first return track and/or inserted into the latter.

This means in particular that not all sequentially placed mold blocks have to be mutually separated and re-sorted after having passed through the guide track in pairs, prior to said mold blocks being re-fed to the guide track. Rather, the passage of the non-extracted mold blocks through the guide track and the first return track is not interrupted. This means that said non-extracted mold blocks in the operation of the corrugator move continuously along the guide track and the first return track. The guide track and the first return track form in particular a continuous sequence or chain of interconnected mold blocks from which individual mold blocks are capable of being extracted and/or into which individual mold blocks are capable of being inserted. This means that a continuous movement of the mold blocks along the guide track and the first return track is performed at all times in the operation of the corrugator.

Individual mold blocks being able to be extracted and/or inserted is in particular to be understood that from the sequence or chain of successively placed mold blocks which are guided along the first return track, specific mold blocks are selectively retrievable from the first return track and feedable to the second return track. The remaining mold blocks then revolve continuously around the guide track and the first return track. This means in particular that the continuous movement of the remaining or non-extracted mold blocks along the guide track and the first return track is not interrupted during the shaping of the tubular plastics product. The same applies in analogous manner to the insertion of the individual mold blocks into the first return track. "Individual" is also to be understood to mean that pairs of individual mold blocks are always extracted and/or inserted. A pair of this type always comprises one right or first mold block, and one second or left mold block. These pairs of mold blocks run conjointly along the guide track and separately of one another along the first return track. The extracted and/or inserted individual mold blocks can also comprise a plurality, for example two or three, mold blocks that are disposed so as to be mutually adjacent. This means that the term "individual mold blocks" does not mandatorily refer to only one mold block.

The second return track can be configured as a conveyor belt, for example, which is suitable for conveying the extracted mold blocks from the outlet region toward the starting region. Two first deflection installations can in particular be provided on the starting region. The first deflection installations can be configured, for example, as gear wheels, rollers, guide rails, or the like. Two second deflection installations are furthermore preferably provided on the outlet region. The first deflection installations deflect the mold blocks from the guide track in particular to the first return track. Two first return tracks that run so as to be mutually parallel are preferably provided, the guide track being positioned therebetween. The mold blocks from the first return tracks are brought together in pairs on the first deflection installations, so as to subsequently pass the guide track. In an analogous manner, the pairs of mold blocks that have run through the guide track are separated at the second deflection installations and fed in each case to one of the first return tracks.

The plastics product is in particular a corrugated tube or a corrugated pipe. The plastics product with the aid of the extrusion system is preferably made as a continuous product and is cut to the desired length downstream of the corrugator.

The corrugator, as has been mentioned above, preferably comprises two first return tracks which are disposed on both sides of the guide track, and two second return tracks which are likewise disposed on both sides of the guide track. The two return tracks herein are preferably disposed between the guide track and the first return tracks. A third to nth return track, in particular in each case two third to nth return tracks, which are in each case disposed on both sides of the guide track can also be provided, wherein the third to nth return track is disposed between the second return track and the guide track.

A respective cavity of the mold blocks is constructed so as to be rotationally symmetrical to a central axis, and comprises a circumferential angle of 180°. This means that a negative of an external geometry of the plastics product is provided with the aid of one pair of mold blocks. "In a paired manner" is to be understood that two identical mold block types are always joined together. A multiplicity of different types of mold blocks which have in each case individually shaped cavities can be provided. A "cavity" is presently to be understood to be a hollow space which forms the negative of the external geometry of the plastics product.

The plastics product, preferably as a not-as-yet solidified plastics tube, is incorporated between the pairs of mold blocks and is subsequently pressed, for example using compressed air, onto the internal side against the respective cavity of the mold block. The desired external geometry of the plastics product results on account thereof. The mold blocks being "capable of extraction" from the first return track is to be understood that specific mold blocks can selectively be retrieved from the first return track and fed to the second return track in the productive operation of the corrugator, that is to say while the mold blocks are being conveyed along the guide track. The individual mold blocks being "capable of insertion" from the second return track to the first return track is to be understood that individual mold blocks can be selectively introduced from the second return track into the first return track in the productive operation of the corrugator. Since the mold blocks are always guided in pairs along the guide track, the two first return tracks and the two second return tracks operate in each case simultaneously and/or synchronously. This means that when a mold block is inserted from a second return track into a first track, a mold block is simultaneously inserted from the other second return track into the other first return track.

The corrugator preferably comprises a multiplicity of first mold blocks wherein each mold block has a first cavity, a multiplicity of second mold blocks wherein each second mold block has a second cavity that differs from the first cavity in terms of the geometry, a guide track along which the first mold blocks and the second mold blocks in the operation of the corrugator are guided in each case in pairs from a starting region of the guide track toward an outlet region of the guide track, a first return track along which the first mold blocks and the second mold blocks in the operation of the corrugator are guided from the outlet region toward the starting region, and a second return track with the aid of which in the operation of the corrugator individual first mold blocks and/or individual second mold blocks are capable of being extracted from the first return track and/or inserted into the latter.

According to one embodiment a direction of movement of the individual mold blocks in an extraction of the latter from the first return track and/or in an insertion of the latter into the first return track is in each case oriented obliquely at an angle relative to a direction of movement of the mold blocks along the first guide track.

The angle can be 10° to 30°, for example. Said angle can be referred to as the first angle. The first angle between the direction of movement in the extraction and/or in the insertion of the individual mold blocks and the direction of movement of the mold blocks along the first return track is in particular not equal to 90°. In an extraction of the individual mold blocks from the first return track into the aforementioned third to nth return track a direction of movement of the individual mold blocks is likewise oriented obliquely at an angle relative to the direction of movement of the mold blocks along the first guide track. Said angle can be referred to as the second angle. The same applies in analogous manner for the extraction of the individual mold blocks from the first return track to the third to nth return track. Said second angle assigned to the third return track herein is larger than the first angle, assigned to the second return track, of the direction of movement of the individual mold blocks in the insertion and/or extraction of the latter. This means that the first angle and the second angle are unequal, wherein the second angle is preferably larger than the first angle. The second angle can be 20° to 30°.

According to one further embodiment the corrugator furthermore comprises a first deflection installation for deflecting the mold blocks from the first return track to the guide track, and a second deflection installation for deflecting the mold blocks from the guide track into the first return track, wherein the mold blocks in the operation of the corrugator continuously move along the guide track and the first return track.

This means that the mold blocks in the operation of the corrugator continuously revolve around the guide track and the first return track. In particular, a direction of movement of the mold blocks along the guide track is oriented so as to be counter to a direction of movement of the mold blocks along the first return track. Two first deflection installations and two second deflection installations are preferably provided. The first deflection installation is in particular assigned to the starting region. The second deflection installation is in particular assigned to the outlet region. The individual mold blocks during the continuous movement of the mold blocks along the guide track and the first return track are in particular capable of being extracted from the first return track and/or inserted into the latter with the aid of the second return track.

According to one further embodiment the corrugator furthermore comprises an extraction installation for selectively extracting the individual mold blocks from the first return track to the second return track.

The corrugator preferably comprises an extraction installation for selectively extracting individual first and/or individual second mold blocks from the first return track to the second return track. Two extraction installations of this type are preferably provided. Each second return track is assigned one extraction installation of this type. The extraction installation can be a conveyor belt, for example, or be configured as a conveyor belt. The extraction installation can be configured as a conveyor belt, for example, or comprise a conveyor belt.

According to one further embodiment the corrugator furthermore comprises an insertion installation for selectively inserting the individual mold blocks from the second return track into the first return track.

The corrugator comprises in particular an insertion installation for selectively inserting individual first mold blocks and/or individual second mold blocks from the second return track into the first return track. Two insertion installations of this type are preferably provided, wherein each second return track is assigned one insertion installation of this type. The insertion installation can comprise a conveyor belt, for example, or be configured as a conveyor belt. The insertion installation can be configured as a conveyor belt, for example, or comprise a conveyor belt.

According to one further embodiment the mold blocks have in each case a marker, in particular a RFID marker wherein the corrugator comprises a detection installation for detecting the marker and a control installation which is specified for actuating the extraction installation and/or the insertion installation such that individual mold blocks, depending on the marker detected, are capable of being extracted from the first return track and/or inserted into the latter.

The first mold blocks and/or the second mold blocks preferably have in each case a marker, in particular a RFID marker, wherein the corrugator comprises a detection installation for detecting the marker, and a control installation which is specified for actuating the extraction installation and/or the insertion installation such that individual first mold blocks or individual second mold blocks, depending on the marker detected, are capable of being extracted from the first return track and/or inserted into the latter.

RFID (radio frequency identification) is a technology for transmitter/receiver systems for automatically identifying and localizing objects in a non-contacting manner with the aid of radio waves. The RFID marker can be a transponder which is fastened to the respective mold block. The sequence of the mold blocks along the guide track for shaping the plastics product with the aid of the control installation can thus be varied in an arbitrary manner without the corrugator having to be stopped.

According to one further embodiment a sequence of the mold blocks in the operation of the corrugator with the aid of the control installation is variable, depending on the marker detected, by an extraction of individual mold blocks from the first return track to the second return track, and/or by an insertion of individual mold blocks from the first return track into the first return track.

A sequence of the first mold blocks and of the second mold blocks, depending on the marker detected, in the operation of the corrugator with the aid of the control installation is in particular variable by an extraction of individual first mold blocks and/or individual second mold blocks from the first return track to the second return track, and/or by an insertion of individual first mold blocks and/or individual second mold blocks from the second return track into the first return track. On account thereof, the sequence of the mold blocks along the guide track, depending on the desired product, can be varied in the productive operation of the corrugator without any additional tooling complexity.

According to one further embodiment the corrugator furthermore comprises a sliding compartment, wherein the mold blocks received in the second return track are retrievable from the second return track with the aid of the sliding compartment.

A plurality of sliding compartments of this type are preferably provided, wherein each second return track is assigned one sliding compartment of this type. The corrugator can furthermore also have two third return tracks, each being likewise assigned one sliding compartment of this type. With the aid of the sliding compartment, the mold blocks can be interchanged rapidly and in a simple manner in the operation of the corrugator. Interchanging individual mold blocks can be dispensed with on account thereof.

According to one further embodiment the corrugator furthermore comprises a third to nth return track with the aid of which the individual mold blocks in the operation of the corrugator are capable of being extracted from the first return track and/or inserted into the latter.

The corrugator comprises in particular a third to nth return track with the aid of which individual first mold blocks and/or individual second mold blocks in the operation of the corrugator are capable of being extracted from the first return track and/or inserted into the latter. The number of return tracks is arbitrary. The corrugator comprises in particular two third return tracks, or two nth return tracks, respectively. n herein is more than or equal to four. Each return track herein can be assigned one type of mold block. Alternatively, arbitrary dissimilar types of mold blocks can also be received in each return track.

According to one further embodiment the corrugator furthermore comprises a multiplicity of first mold blocks wherein each first mold block has a first cavity, a multiplicity of second mold blocks wherein each second mold block has a second cavity that differs from the first cavity in terms of the geometry, wherein the first mold blocks and the second mold blocks in the operation of the corrugator are guided in each case in pairs along the guide track from the starting region toward the outlet region, wherein the first mold blocks and the second mold blocks in the operation of the corrugator are guided along the first return track from the outlet region toward the starting region, and wherein individual first mold blocks and/or individual second mold blocks in the operation of the corrugator with the aid of the second return track are capable of being extracted from the first return track and/or inserted into the latter.

The first mold blocks can also be referred to as corrugation mold blocks, and the second mold blocks can also be referred to as sleeve mold blocks. The first mold blocks are in particular specified for molding a corrugated geometry on the plastics product. The second mold blocks are in particular specified for molding a sleeve geometry on the plastics product.

According to one further embodiment the corrugator furthermore comprises a multiplicity of third to nth mold blocks, wherein each third to nth mold block has a third to nth cavity that differs from the first cavity and the second cavity in terms of the geometry, wherein individual first mold blocks, individual second mold blocks, and/or individual third to nth mold blocks in the operation of the corrugator with the aid of the third to nth return track are capable of being extracted from the first return track and/or inserted into the latter.

The number of dissimilar types of mold blocks is arbitrary. For example, the third mold blocks are specified for molding a smooth tubular region on the plastics part.

Therefore, the third mold blocks can also be referred to as smooth tubular mold blocks.

According to one further embodiment the guide track, the first return track, and the second return track are disposed so as to be mutually parallel.

In particular, a direction of movement in which the mold blocks are guided along the guide track is oriented so as to be counter to the direction of movement along which the mold blocks are guided along the first return track, the second return track, and/or the third return track. The corrugator preferably also comprises a drive installation which is specified for conveying the mold blocks along the guide track. To this end, the drive installation can have, for example, a pinion which is specified for engaging in a form-fitting manner in a toothing that is provided on the mold blocks.

According to one further embodiment the second return track has an extraction portion and/or an insertion portion, wherein the extraction portion and/or the insertion portion are/is disposed so as to be oblique to the first return track.

The third return track can furthermore also have an extraction portion and/or an insertion portion, said extraction portion and/or insertion portion being in each case disposed so as to be oblique to the first return track. An angle between the first return track and the extraction portion, or between the first return track and the insertion portion, respectively, can be 10° to 30°, for example. The extraction portion and/or the insertion portion can be configured as a conveyor belt or comprise a conveyor belt.

An extrusion system having a corrugator of this type and an extruder disposed upstream of the corrugator is furthermore proposed.

The extruder can have an injection head which feeds a plasticized plastics material to the corrugator. A tubular semi-finished product can be made with the aid of the corrugator, said tubular semi-finished product with the aid of compressed air being pressed on the internal side onto the cavity of the mold blocks. The extruder can be a single-screw or a twin-screw extruder. The extruder can be suitable for coextrusion. This means that dissimilar plastics materials can be simultaneously processed with the aid of the extruder.

A method for operating a corrugator which comprises a multiplicity of mold blocks, a guide track, a first return track and a second return track is furthermore proposed, wherein the method comprises the following method steps: guiding in each case in pairs the mold blocks along the guide track from a starting region of the guide track toward an outlet region of the guide track; guiding the mold blocks along the first return track from the outlet region toward the starting region; extracting individual mold blocks from the first return track to the second return track, and/or inserting individual mold blocks from the second return track into the first return track.

The method can also comprise the extraction and/or insertion of individual first mold blocks, second mold blocks, and/or third mold blocks from the second return track or the third return track into the first return track. The sequence of the mold blocks along the guide track in the productive operation of the corrugator can be varied with the aid of the method without stopping the corrugator.

In particular, a method for operating a corrugator which comprises a multiplicity of first mold blocks wherein each mold block has a first cavity, a multiplicity of second mold blocks wherein each second mold block has a second cavity that differs from the first cavity in terms of the geometry, a guide track, a first return track, and a second return track is proposed. The method comprises the following steps: guiding in each case in pairs the first mold blocks and the second mold blocks along the guide track from a starting region of the guide track toward an outlet region of the guide track; guiding the first mold blocks and the second mold blocks along the first return track from the outlet region toward the starting region; extracting individual first mold blocks and/or individual second mold blocks from the first return track into the second return track, and/or inserting individual first mold blocks and/or individual second mold blocks from the second return track into the first return track.

According to one embodiment the individual mold blocks are extracted from the first return track and/or inserted into the first return track such that a direction of movement of the individual mold blocks in the extraction and/or in the insertion is in each case oriented so as to be oblique at an angle relative to a direction of movement of the mold blocks along the first guide track.

The angle can be 10° to 30°, for example. The angle between the direction of movement in the extraction and/or in the insertion of the individual mold blocks and the direction of movement of the mold blocks along the first return track is in particular not equal to 90°. As already mentioned above, the angle can be referred to as the first angle.

According to one further embodiment, a marker, in particular a RFID marker, of the mold blocks is in each case detected with the aid of the detection installation, wherein an extraction installation and/or an insertion installation with the aid of a control installation are/is actuated such that the individual mold blocks, depending on the marker detected, are extracted from the first return track and/or inserted into the latter.

A marker, in particular an RFID marker, of the first mold blocks and/or of the second mold blocks is in each case preferably detected with the aid of a detection installation, wherein an extraction installation and/or an insertion installation with the aid of the control installation is actuated such that individual first mold blocks and/or individual second mold blocks, depending on the marker detected, are extracted from the first return track and/or inserted into the latter. Each mold block preferably has a dedicated RFID marker. The type and the position of the respective mold block can be detected in a non-contacting manner and also when in motion with the aid of the RFID marker.

According to one further embodiment a sequence of the mold blocks with the aid of the control installation is varied depending on the marker detected by an extraction of individual mold blocks from the first return track into the second return track and/or by an insertion of individual mold blocks from the second return track into the first return track.

A sequence of the first mold blocks and of the second mold blocks, depending on the marker detected, is varied in particular with the aid of the control installation by an extraction of individual first mold blocks and/or individual second mold blocks from the first return track to the second return track, and/or by an insertion of individual first mold blocks and/or individual second mold blocks from the second return track into the first return track. On account thereof, the geometry of the plastics product produced in the ongoing productive operation of the corrugator can be varied. On account thereof, dissimilar plastics products can be produced with the aid of the corrugator without a high tooling complexity.

According to one further embodiment the mold blocks are guided so as to be mutually parallel along the guide track, the first return track, and the second return track.

In particular, the mold blocks are also guided along the third return track so as to be parallel with the guide track, the first return track, and the second return track. A direction of movement of the mold blocks along the guide track is oriented so as to be counter to a direction of movement of the mold blocks along the first return track, the second return track, and/or the third return track.

The features described in conjunction with the corrugator apply in analogous manner to the method, and vice versa.

Further potential implementations of the corrugator, of the extrusion system, and/or of the method also comprise combinations not explicitly mentioned of features or embodiments described above or hereunder with reference to the exemplary embodiments. A person skilled in the art herein will also add individual aspects as improvements or supplementations to the respective basic form of the corrugator, the extrusion system, and/or the method.

Further advantageous design embodiments and aspects of the corrugator, the extrusion system, and/or the method are the subject matter of the dependent claims and of the exemplary embodiments described hereunder of the corrugator, the extrusion system, and/or of the method. The corrugator, the extrusion system, and/or the method will furthermore be explained in more detail by means of preferred embodiments with reference to the appended figures in which:

Unless otherwise stated, identical or functionally equivalent elements have been provided with the same reference signs in the figures.

Figure 1:
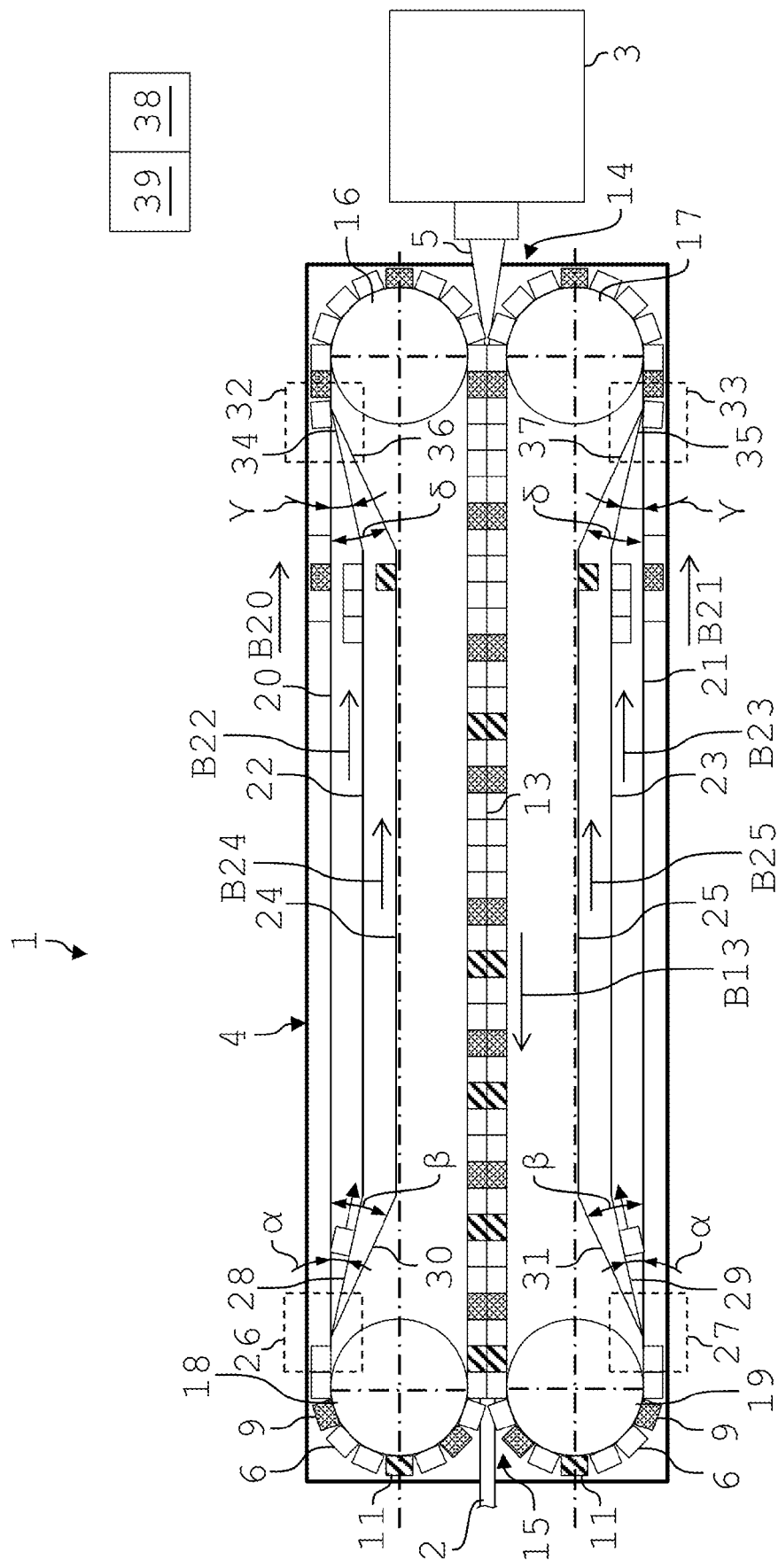
FIG. 1 shows a schematic plan view of an embodiment of an extrusion system.
Figure 2:
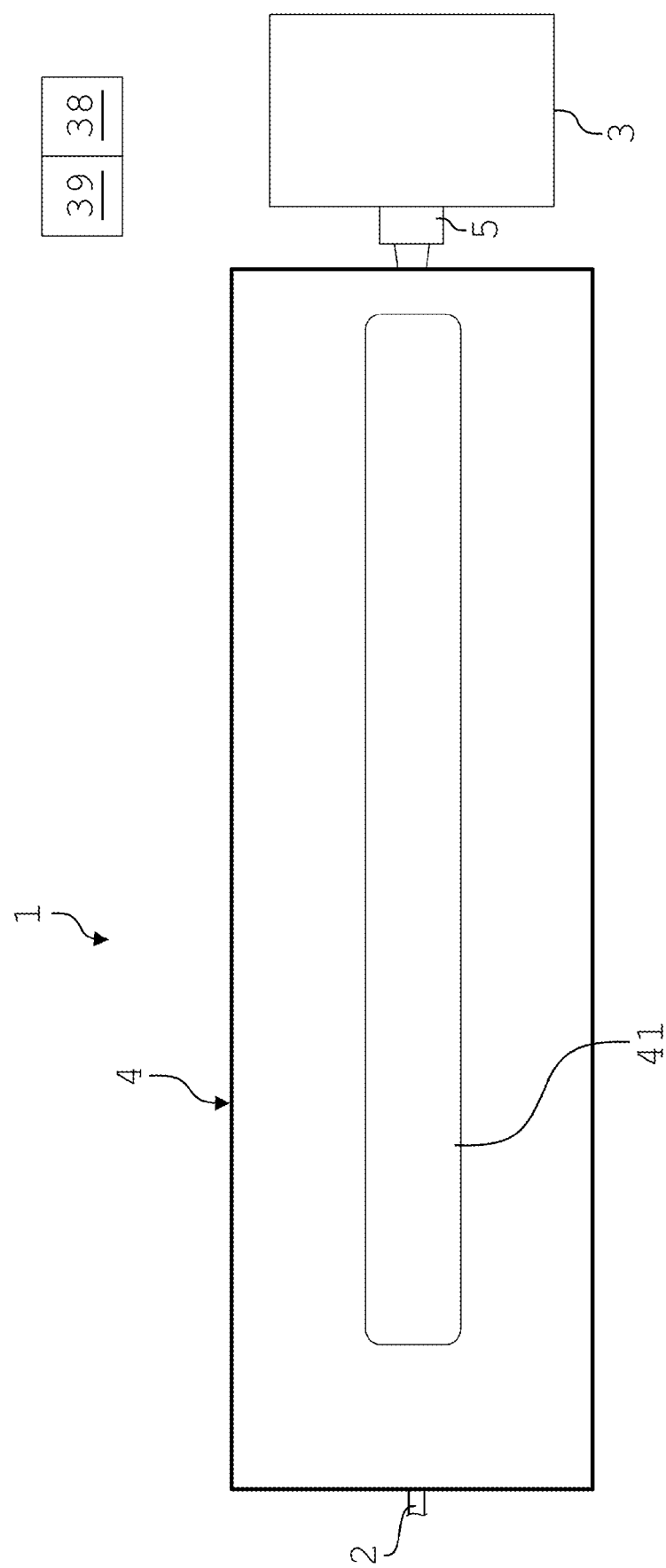
FIG. 2 shows a schematic side view of the extrusion system according to FIG. 1.

FIG. 1 shows a schematic plan view of an extrusion system 1. FIG. 2 shows a schematic side view of the extrusion system 1. Reference hereunder is made simultaneously to FIGS. 1 and 2.

DETAILED DESCRIPTION

The extrusion system 1 is suitable for the production of a tubular plastics product 2. The plastics product 2 is a corrugated tube or a corrugated pipe. A corrugated tube differs from the likewise axially flexible corrugated pipe in terms of the elasticity in the directions viewed radially and longitudinally. Said elasticity is caused by the material, but can also be facilitated by the shaping of the corrugation. Corrugated tubes are both a protective pipe for the actual beneficiaries such as cable ducts or the like, as well as per se conveyors of liquids and gases.

The plastics product 2 with the aid of the extrusion system 1 is made as a continuous product and cut to the desired length with the aid of a cutting installation that is disposed downstream of the extrusion system 1. The extrusion system 1 comprises an extruder 3 for plasticizing plastics material, and a corrugator 4. The extruder 3 can be a single-screw extruder or a twin-screw extruder. The extruder 3 can be suitable for coextrusion. This means that dissimilar plastics materials can be simultaneously processed with the aid of the extruder 3.

The corrugator 4 is suitable for imparting a desired geometry, in particular an external geometry, to the tubular plastics product 2. The extruder 3 comprises an injection head 5 which feeds the molten plastics material to the corrugator 4. The corrugator 4 is positioned so as to be downstream of the injection head 5.

Figure 3:
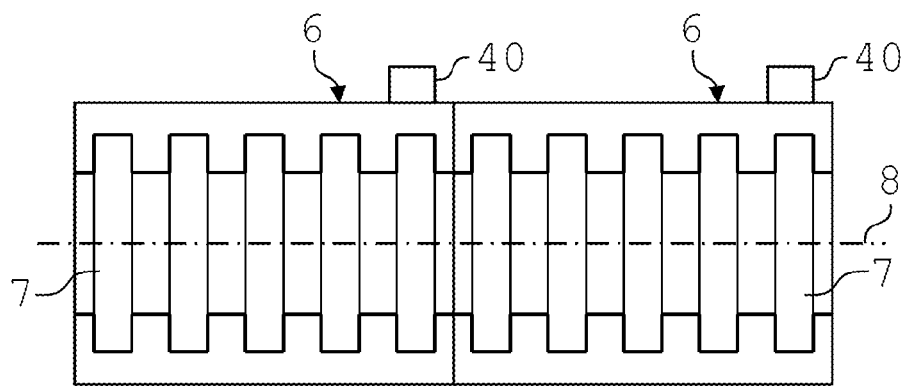
FIG. 3 shows a schematic plan view of an embodiment of mold blocks for a corrugator of the extrusion system according to FIG. 1.

The corrugator 4 furthermore comprises a multiplicity of first mold blocks 6 (FIG. 3). Each first mold block 6 has a first hollow space or a first cavity 7. The first cavity 7 can have a corrugated geometry. The geometry of the plastics product 2 can be shaped with the aid of the first cavity 7. Since the first cavity 7 is corrugated, the first mold blocks 6 can also be referred to as corrugated mold blocks. The first cavity 7 is configured so as to be rotationally symmetrical to a symmetry or central axis 8, wherein the first cavity 7 has a circumferential angle of 180°. This means that one pair of first mold blocks 6 form in each case one circumferentially closed hollow space which is disposed so as to be rotationally symmetrical to the central axis 8 and which is formed by two first cavities 7. Each first mold block 6 configures in particular one half shell.

Figure 4:
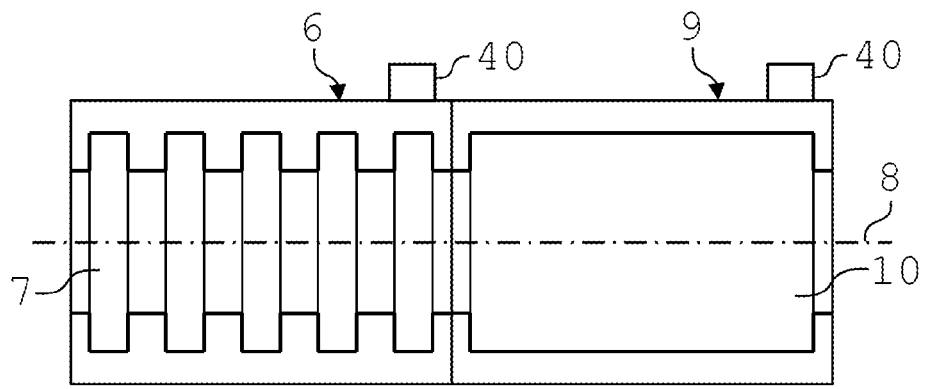
FIG. 4 shows a schematic plan view of a further embodiment of mold blocks for the corrugator of the extrusion system according to FIG. 1.

The corrugator 4 furthermore comprises a multiplicity of second mold blocks 9 (FIG. 4) having a second cavity 10. The second cavity 10 differs from the first cavity 7 in terms of the geometry. As is shown in FIG. 4, the second cavity 10 may not have a corrugated but a smooth geometry. For example, a sleeve can be molded on the plastics product 2 with the aid of the second cavity 10. The second mold block 9 can therefore also be referred to as the sleeve mold block. The second cavity 10 is likewise configured so as to be rotationally symmetrical to the central axis 8 and can have a circumferential angle of 180°. A pair of second mold blocks 9 forms a circumferentially closed hollow space which is formed by two second cavities 10 and which is configured so as to be rotationally symmetrical to the central axis 8.

Figure 5:
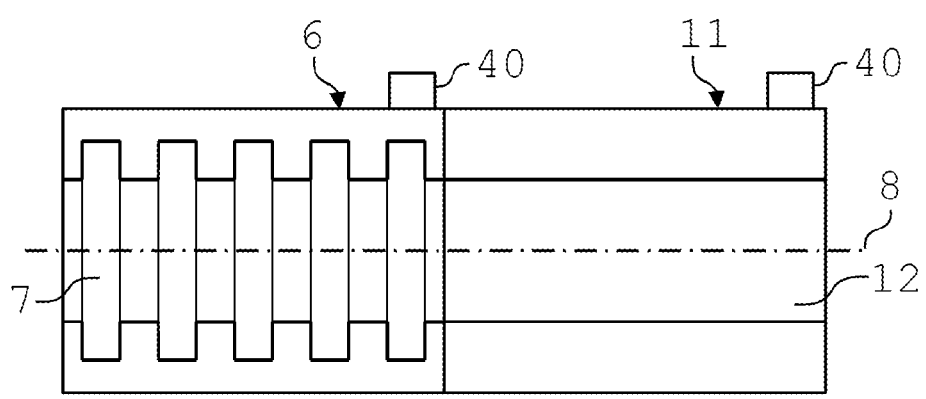
FIG. 5 shows a schematic plan view of a further embodiment of mold blocks for the corrugator of the extrusion system according to FIG. 1.

The corrugator 4 can furthermore have an arbitrary number of third mold blocks 11 (FIG. 5). The third mold blocks 11 comprise in each case a third cavity 12, the geometry of the latter differing from the geometry of the first cavity 7 and from the geometry of the second cavity 10. For example, a smooth tubular region can be molded on the plastics product 2 with the aid of the third cavity 12. The third mold blocks 11 can therefore also be referred to as smooth tubular mold blocks. The third cavity 12 is likewise configured so as to be rotationally symmetrical to the central axis 8 and has a circumferential angle of 180°, wherein a pair of third mold blocks 11 configures a circumferentially closed hollow space which is formed with the aid of two third cavities 12.

The corrugator 4 can have an arbitrary number of dissimilar types of mold blocks 6, 9, 11. For example, the corrugator 4 can also have four, five, or more dissimilar types of mold blocks 6, 9, 11. The mold blocks 6, 9, 11 are preferably made from a metal material, in particular from an aluminum alloy. The mold blocks 6, 9, 11 can be cooled, in particular air-cooled, oil-cooled, or water-cooled. To this end, cooling ducts can be provided in the mold blocks 6, 9, 11.

Now reverting to FIG. 1, the corrugator 4 comprises a guide track 13 along which the mold blocks 6, 9, 11 are guided in the operation of the corrugator 4. The mold blocks 6, 9, 11 in FIG. 1 are illustrated as rectangles which are empty, or filled in a dissimilar manner, respectively. The mold blocks 6, 9, 11 move along the guide track 13 in a first direction of movement B13, from a starting region 14 toward an outlet region 15 of the guide track 13. The mold blocks 6, 9, 11 in the operation of the corrugator 4 are in each case guided in pairs along the guide track 13. This means that always two first mold blocks 6, two second mold blocks 9, or two third mold blocks 11 form in each case a mold block pair. To this end, the mold blocks 6, 9, 11 are in each case brought together in pairs in the starting region 14. This means that one of the first mold blocks 6 is in each case assigned a further first mold block 6, one of the second mold blocks 9 is in each case assigned a further second mold block 9, and one of the third mold blocks 11 is in each case assigned a further third mold block 11 in the starting region 14.

The molten plastics material in the starting region 14 with the aid of the injection head 5 is metered as a continuous tube between the mold blocks 6, 9, 11, and for example with the aid of compressed air on the internal side is pressed against the respective cavity 7, 10, 12 in order for the plastics product 2 to be shaped. The pairs of mold blocks 6, 9, 11 are in each case again separated from another at the outlet region 15 of the guide track 13. The guide track 13 can be a guide rail, a conveyor belt, or an arbitrary conveying installation which is specified for transporting the mold blocks 6, 9, 11 in the first direction of movement B13 from the starting region 14 toward the outlet region 15.

Two first deflection installations 16, 17 are provided on the starting region 14. The first deflection installations 16, 17 can be configured, for example, as gear wheels, rollers, guide rails, or the like. Two second deflection installations 18, 19 are furthermore provided on the outlet region 15. A drive installation can be provided for transporting the mold blocks 6, 9, 11 along the guide track 13. The drive installation can be, for example, a pinion which engages in a form-fitting manner in a toothing that is provided on the mold blocks 6, 9, 11. The mold blocks 6, 9, 11 are then conveyed along the guide track 13 in the first direction of movement B13 with the aid of the drive installation.

The corrugator 4 furthermore comprises two first return tracks 20, 21 along which the mold blocks 6, 9, 11 in the operation of the corrugator 4 are guided from the outlet region 15 toward the starting region 14. A respective direction of movement B20, B21 of the mold blocks 6, 9, 11 along the first return tracks 20, 21 herein is oriented so as to be counter to the first direction of movement B13. The first return tracks 20, 21 and the guide track 13 are disposed so as to be mutually parallel. In a manner deviating from the illustration in FIG. 1, both first return tracks 20, 21 in the operation of the corrugator 4 are completely filled with mutually contacting mold blocks 6, 9, 11 such that the mold blocks 6, 9, 11 can be conveyed along the first return tracks 20, 21 with the aid of the drive installation assigned to the guide track 13.

The corrugator 4 furthermore comprises two second return tracks 22, 23. The two second return tracks 22, 23 are disposed so as to be parallel with the guide track 13 and the two first return tracks 20, 21. A respective direction of movement B22, B23 is oriented so as to be counter to the first direction of movement B13. The corrugator 4 can furthermore have two third return tracks 24, 25. The number of return tracks 20 to 25 is arbitrary. A respective direction of movement B24, B25 is oriented so as to be counter to the first direction of movement B13. The corrugator 4 however has at least the two first return tracks 20, 21 and the two second return tracks 22, 23.

In the operation of the corrugator 4, individual mold blocks 6, 9, 11 with the aid of the second return tracks 22, 23 and the third return tracks 24, 25 can be extracted from the respective first return track 20, 21 or inserted into the latter. "Extraction" or "insertion", respectively, is presently to be understood that individual mold blocks 6, 9, 11 with the aid of the second return tracks 22, 23 and/or the third return tracks 24, 25 are capable of being retrieved from the first return track 20, 21 or introduced into the latter. Said extraction and insertion herein can be performed without the transportation of the mold blocks 6, 9, 11 along the guide track 13 having to be interrupted.

The second return tracks 22, 23 and the third return tracks 24, 25 are configured, for example, as conveyor belts which are specified for conveying the respective mold blocks 6, 9, 11 in the corresponding directions of movement B22 to B25. The directions of movement B22 to B25 herein are oriented so as to be parallel with the first direction of movement B13 and counter to the latter.

An extraction installation 26, 27 can in each case be provided for extracting the mold blocks 6, 9, 11 from the respective first return track 20, 21. Each extraction installation 26, 27 is assigned an extraction portion 28, 29 with the aid of which the respective extracted mold blocks 6, 9, 11 are fed to the respective second return track 22, 23. The extraction portions 28, 29 are in each case inclined at an angle $\alpha$ to the respective first return track 20, 21. The extraction installations 26, 27 furthermore comprise extraction portions 30, 31 for feeding the extracted mold blocks 6, 9, 11 into the third return tracks 24, 25. The extraction portions 30, 31 are in each case inclined at an angle $\beta$ to the first return track 20, 21. The angle $\beta$ herein can be larger than the angle $\alpha$. For example, the angle $\alpha$ can be 10° to 20°, and the angle $\beta$ can be 20° to 30°.

The corrugator 4 furthermore comprises two insertion installations 32, 33 for selectively inserting individual mold blocks 6, 9, 11 from the second return tracks 22, 23 and/or the third return tracks 24, 25 into the first return tracks 20, 21. The insertion installations 32, 33 comprise in each case insertion portions 34, 35 for feeding the individual mold blocks 6, 9, 11 from the second return tracks 22, 23 to the first return tracks 20, 21. The insertion portions 34, 35 are in each case inclined at an angle $\gamma$ relative to the first return tracks 20, 21. The angle $\gamma$ can be equal to the angle $\alpha$. The angles $\alpha, \gamma$ can be referred to as first angles. The insertion installations 32, 33 furthermore comprise insertion portions 36, 37 for feeding the mold blocks 6, 9, 11 from the third return tracks 24, 25 to the first return tracks 20, 21. The insertion portions 36, 37 are in each case inclined at an angle δ relative to the first return tracks 20, 21. The angle δ can be equal to the angle β. The angles β, δ can be referred to as second angles.

The corrugator 4 furthermore comprises a control installation 38 as well as a detection installation 39. The mold block type can be determined with the aid of the detection installation 39. This means that it can be detected with the aid of the detection installation 39 which type of mold block 6, 9, 11 is located where in the guide track 13, or in the return tracks 20 to 25, respectively. To this end, each mold block 6, 9, 11 can have a marker 40 (FIGS. 3 to 5), in particular a RFID marker.

The functional mode of the corrugator 4 will be explained hereunder. In the operation of the corrugator 4, the mold blocks 6, 9, 11 with the aid of the deflection installation 16, 17 are brought together in pairs in the starting region 14 of the first guide track 13, wherein the plasticized plastics material in the form of a smooth tube with the aid of the injection head 5 is metered in between the closing mold blocks 6, 9, 11. The plasticized plastics material with the aid of compressed air is pressed against the internal walls of the cavities 7, 10, 12, on account of which the plastics product 2 is imparted the desired geometry.

The plastics material cools down in the transportation of the mold blocks 6, 9, 11 along the first guide track 13 in the first direction of movement B13, until said plastics material at the outlet region 15 of the guide track 13 has cooled down to the point that the plastics product 2 can be demolded. To this end, the mold blocks 6, 9, 11 that are disposed in pairs are separated from one another again with the aid of the deflection installations 18, 19 in the outlet region 15, and assigned to the respective first return track 20, 21 along which the mold blocks 6, 9, 11 in the direction of movement B20, B21 are again fed to the starting region 14 of the guide track 13.

The desired geometry of the finished plastics product 2 is determined with the aid of a corresponding sequence of the mold blocks 6, 9, 11. For example, one pair of second mold blocks 9 is followed by two pairs of first mold blocks 6, one pair of third mold blocks 11, and one pair of first mold blocks 6. The sequence of the mold blocks 6, 9, 11 herein is arbitrary.

If the sequence of the mold blocks 6, 9, 11 in the guide track 13 is now to be varied in the operation of the corrugator 4, individual mold blocks 6, 9, 11 can be extracted from the first return track 20, 21 with the aid of the second return track 22, 23, in particular with the aid of the respective extraction installation 26, 27. The sequence of the mold blocks 6, 9, 11 is varied on account thereof, on account of which the plastics product 2 can vary the geometry of the corrugator 4 in the operation thereof.

If additional mold blocks 6, 9, 11 are now to be inserted into the first return track 20, 21, selectively selected mold blocks 6, 9, 11 are fed to the first return track 20, 21 with the aid of the second return tracks 22, 23 and in particular the insertion installations 32, 33, on account of which the sequence of the mold blocks 6, 9, 11 along the guide track 13 is varied. The same applies in analogous manner to the third return tracks 24, 25. The pairs of return tracks 20, 21, 22, 23 and 24, 25 herein always operate in a synchronous manner such that the matching pairs of mold blocks 6, 9, 11 are always brought together in the starting region 14.

In order for the type of mold blocks 6, 9, 11 to be detected, the latter have the markers 40 which have already been mentioned above and which are detected with the aid of the detection installation 39. The corrugator 4 herein can have a plurality of detection installations 39. For example, the detection installation 39, or the detection installations 39, is/are assigned to the extraction installations 26, 27 and/or the insertion installations 32, 33. The control installation 38 is specified for actuating the extraction installation 26, 27 and/or the insertion installation 32, 33 such that, depending on the marker 40 detected, individual mold blocks 6, 9, 11 are extracted from the first return track 20, 21 or inserted into the latter.

As is shown in FIG. 2, the corrugator 4 can have a sliding compartment 41 with the aid of which all mold blocks 6, 9, 11 that are received in one of the return tracks 22 to 25 are retrievable. On account thereof, a changeover of the mold blocks 6, 9, 11 can be performed in the operation of the corrugator 4. The corrugator 4 can have a plurality of sliding compartments 41 of this type.

Figure 6:
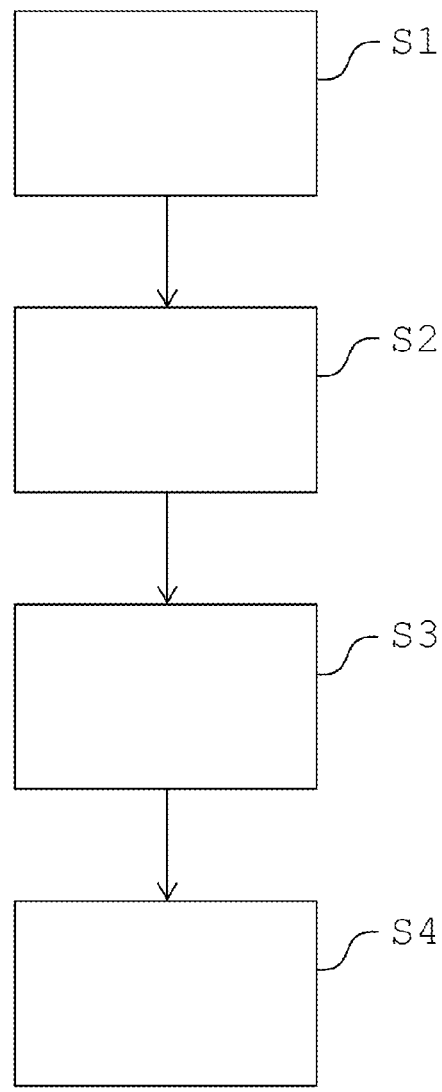
FIG. 6 shows a schematic block diagram is of an embodiment of a method for operating the corrugator for the extrusion system according to FIG. 1.

FIG. 6 schematically shows a block diagram of an embodiment of a method for operating the corrugator 4. In a step S1 the mold blocks 6, 9, 11 are in each case guided in pairs along the guide track 13 from the starting region 14 toward the outlet region 15. The plastics product 2 herein is imparted the desired geometry.

In a step S2 the mold blocks 6, 9, 11 are guided along the first return tracks 20, 21 from the outlet region 15 toward the starting region 14. In a step S3 individual mold blocks 6, 9, 11 are extracted from the first return track 20, 22 into one of the return tracks 22 to 25. Alternatively or additionally, in a step S4 individual mold blocks 6, 9, 11 from one of the return tracks 22 to 25 can be inserted into the first return tracks 20, 21.

In each of the steps S1 to S4 the markers 40 can be detected with the aid of the detection installation 39, wherein the respective extraction installation 26, 27 and/or the respective insertion installation 32, 33 with the aid of the control installation 38 is actuated in such a manner that, depending on the marker 40 detected, individual mold blocks 6, 9, 11 are extracted from the first return track 20, 21 and/or inserted into the latter.

The sequence of the mold blocks 6, 9, 11 depending on the marker 40 detected is thus varied by extracting or inserting individual mold blocks 6, 9, 11 from one of the return tracks 22 to 25 into the first return track 20, 21.

The afore-described corrugator 4 and the afore-described method have the following advantages. Stopping the extrusion system 1 for changing the mold blocks 6, 9, 11, or for changing the sequence of the mold blocks 6, 9, 11 along the guide track 13, respectively, can be dispensed with. In particular, plastics products 2 of dissimilar length and dissimilar geometries can also be produced without stopping the extrusion system 1 in order for the latter to be retooled. On account thereof, a significantly lower tooling complexity and less starting-up waste are created.

Since the geometry of the plastics product 2 can be varied in an arbitrary manner, even small quantities of said plastics product 2 can be rapidly and readily produced, a reduced inventory complexity resulting on account thereof. Automatic parts sorting after the cutting-to-length of the plastics product 2 can be performed by way of an integrated control system. Fewer error sources result on account of the automatic assembly of the mold blocks 6, 9, 11. Interchanging the mold blocks 6, 9, 11 in the operation of the extrusion system 1 is readily possible with the aid of the sliding compartment 41.

While the present invention has been described by means of exemplary embodiments said present invention is capable of modification in a diverse manner.

REFERENCE CHARACTERS LIST

1 Extrusion system
2 Plastics product
3 Extruder
4 Corrugator
5 Injection head
6 Mold block
7 Cavity
8 Central axis
9 Mold block
10 Cavity
11 Mold block
12 Cavity
13 Guide track
14 Starting region
15 Outlet region
16 Deflection installation
17 Deflection installation
18 Deflection installation
19 Deflection installation
20 Return track
21 Return track
22 Return track
23 Return track
24 Return track
25 Return track
26 Extraction installation
27 Extraction installation
28 Extraction portion
29 Extraction portion
30 Extraction portion
31 Extraction portion
32 Insertion installation
33 Insertion installation
34 Insertion portion
35 Insertion portion
36 Insertion portion
37 Insertion portion
38 Control installation
39 Detection installation
40 Marker
41 Sliding compartment
B13 Direction of movement
B21 Direction of movement
B22 Direction of movement
B23 Direction of movement
B24 Direction of movement
B25 Direction of movement
S1 Step
S2 Step
S3 Step
S4 Step
α Angle
β Angle
γ Angle
δ Angle

The invention claimed is:

1. A corrugator for an extrusion system for shaping a tubular plastics product, the corrugator comprising:
a multiplicity of mold blocks;
a guide track along which the mold blocks in the operation of the corrugator are guided in each case in pairs from a starting region of the guide track toward an outlet region of the guide track;
two first return tracks which are respectively disposed on opposite sides of the guide track and along which the mold blocks in the operation of the corrugator are guided from the outlet region toward the starting region; and
two second return tracks which are likewise respectively disposed on opposite sides of the guide track and with the aid of which individual mold blocks in the operation of the corrugator are capable of being extracted from the first return tracks and/or inserted into the latter, wherein
the two second return tracks are disposed between the guide track and the first return tracks.

2. The corrugator as claimed in claim 1, wherein a direction of movement of the individual mold blocks in an extraction of the latter from the first return tracks and/or in an insertion of the latter into the first return tracks is in each case oriented obliquely at an angle relative to a direction of movement of the mold blocks along the first return tracks.

3. The corrugator as claimed in claim 1, furthermore comprising a first deflection installation for deflecting the mold blocks from the first return tracks to the guide track, and a second deflection installation for deflecting the mold blocks from the guide track into the first return tracks, wherein the mold blocks in the operation of the corrugator continuously move along the guide track and the first return tracks.

4. The corrugator as claimed in claim 1, furthermore comprising an extraction installation for selectively extracting the individual mold blocks from the first return tracks into the second return tracks.

5. The corrugator as claimed in claim 1, furthermore comprising an insertion installation for selectively inserting the individual mold blocks from the second return tracks into the first return tracks.

6. The corrugator as claimed in claim 5, wherein the mold blocks have in each case a marker, wherein the corrugator comprises a detection installation for detecting the marker, and a control installation which is specified for actuating an extraction installation and/or the insertion installation such that the individual mold blocks, depending on the marker detected, are capable of being extracted from the first return tracks and/or inserted into the latter.

7. The corrugator as claimed in claim 1, furthermore comprising a third to nth return track with the aid of which the individual mold blocks in the operation of the corrugator are capable of being extracted from the first return tracks and/or inserted into the latter.

8. The corrugator as claimed in claim 1, furthermore comprising a multiplicity of first mold blocks wherein each first mold block has a first cavity, a multiplicity of second mold blocks wherein each second mold block has a second cavity that differs from the first cavity in terms of the geometry, wherein the first mold blocks and the second mold blocks in the operation of the corrugator are guided in each case in pairs along the guide track from the starting region toward the outlet region, wherein the first mold blocks and the second mold blocks in the operation of the corrugator are guided along the first return tracks from the outlet region toward the starting region, and wherein individual first mold blocks and/or individual second mold blocks in the operation of the corrugator with the aid of the second return tracks are capable of being extracted from the first return tracks and/or inserted into the latter.

9. The corrugator as claimed in claim 7, furthermore comprising a multiplicity of third to nth mold blocks, wherein each third to nth mold block has a third to nth cavity that differs from the first cavity and the second cavity in terms of the geometry, wherein individual first mold blocks, individual second mold blocks, and/or individual third to nth mold blocks in the operation of the corrugator with the aid of the third to nth return tracks are capable of being extracted from the first return tracks and/or inserted into the latter.

10. The corrugator as claimed in claim 1, wherein the second return tracks each have respective extraction portions and/or an insertion portions, and wherein the extraction portions and/or the insertion portions are disposed so as to be oblique to the first return tracks.

11. An extrusion system having a corrugator as claimed in claim 1 and an extruder disposed upstream of the corrugator.

12. The corrugator as claimed in claim 6, wherein the marker is an RFID marker.

13. A method for operating the corrugator of claim 1, wherein the method comprises the following method steps:
provide the corrugator;
guiding in each case in pairs the mold blocks along the guide track from the starting region of the guide track toward the outlet region of the guide track;
guiding the mold blocks along the first return tracks from the outlet region toward the starting region;
extracting individual mold blocks from the first return tracks into the second return tracks; and/or
inserting individual mold blocks from the second return tracks into the first return tracks.

14. The method as claimed in claim 13, wherein the individual mold blocks are extracted from the first return tracks and/or inserted into the first return tracks such that a direction of movement of the individual mold blocks in the extraction and/or in the insertion is in each case oriented so as to be oblique at an angle relative to a direction of movement of the mold blocks along the first return tracks.

15. The method as claimed in claim 13, wherein in each case a marker of the mold blocks is detected with the aid of a detection installation, and wherein an extraction installation and/or an insertion installation with the aid of a control installation are/is actuated such that the individual mold blocks, depending on the marker detected, are extracted from the first return track and/or inserted into the latter.

16. The method as claimed in claim 13, wherein the mold blocks are guided so as to be mutually parallel along the guide track, the first return tracks, and the second return tracks.

* * * * *